United States Patent
Kobayashi et al.

(10) Patent No.: US 10,969,764 B2
(45) Date of Patent: Apr. 6, 2021

(54) SUPPORT DEVICE, DESIGN SUPPORT METHOD AND COMPUTER-READABLE NON-TRANSITORY MEDIUM

(71) Applicant: FUJITSU LIMITED, Kawasaki (JP)

(72) Inventors: Sachio Kobayashi, Sagamihara (JP); Hiroki Kobayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 104 days.

(21) Appl. No.: 16/017,381

(22) Filed: Jun. 25, 2018

(65) Prior Publication Data

US 2019/0011900 A1     Jan. 10, 2019

(30) Foreign Application Priority Data

Jul. 6, 2017   (JP) .............................. JP2017-133084

(51) Int. Cl.
   *G05B 19/4097*   (2006.01)
   *G05B 19/418*    (2006.01)
   *G06Q 50/04*     (2012.01)

(52) U.S. Cl.
   CPC ... *G05B 19/4097* (2013.01); *G05B 19/41865* (2013.01); *G05B 2219/31343* (2013.01); *G06Q 50/04* (2013.01)

(58) Field of Classification Search
   CPC .......... G05B 19/4097; G05B 19/41865; G05B 2219/31343; G06Q 50/04; G06F 17/50; G06F 30/00; B25J 9/1687; B25J 9/1661
   See application file for complete search history.

(56) References Cited

U.S. PATENT DOCUMENTS 5,040,123 A  *  8/1991  Barber .................. G06Q 10/06
                                                    700/100
5,255,181 A  *  10/1993  Chapman ......... G05B 19/41865
                                                    705/7.25
(Continued)

FOREIGN PATENT DOCUMENTS

EP    2 610 696 A1    7/2013
JP    5-114003        5/1993
(Continued)

OTHER PUBLICATIONS

Extended European Search Report dated Oct. 31, 2018 corresponding to European Patent Application No. 18180940.1.
(Continued)

*Primary Examiner* — Nathan L Laughlin
(74) *Attorney, Agent, or Firm* — Staas & Halsey LLP

(57) ABSTRACT

A design support device includes: a memory; and a processor configured to execute a process, the process including: receiving a precedence restriction, a work time and advisability of a robot work, with respect to a product; calculating, as a first index, a continuous work number in a case where each work which a robot cannot perform is changed to a work which the robot can perform, on a basis of the precedence restriction and the advisability of the robot work; calculating, as a second index, an arrangement freedom in the case on a basis of the precedence restriction, the work time and the advisability of the robot work; associating information according to the first index and the second index with an object work of the first index and the second index; and presenting the information and the object work.

9 Claims, 13 Drawing Sheets

(56) References Cited

U.S. PATENT DOCUMENTS

| | | | | |
|---|---|---|---|---|
| 5,442,561 | A * | 8/1995 | Yoshizawa | G05B 19/41865 700/100 |
| 6,105,520 | A * | 8/2000 | Frazer | D05B 11/00 112/117 |
| 9,050,723 | B1 * | 6/2015 | Elazary | G06F 11/0793 |
| 2005/0135861 | A1 * | 6/2005 | Mori | B41J 3/46 400/693 |
| 2005/0235249 | A1 * | 10/2005 | Friemelt | G06Q 10/00 717/102 |
| 2006/0155406 | A1 * | 7/2006 | Rossi | G05B 19/41865 700/99 |
| 2008/0066072 | A1 * | 3/2008 | Yurekli | G06Q 10/06 718/104 |
| 2013/0290970 | A1 * | 10/2013 | Shah | G06F 9/4887 718/102 |
| 2014/0351819 | A1 * | 11/2014 | Shah | G06F 9/4887 718/103 |
| 2018/0164775 | A1 * | 6/2018 | Crivella | G05B 19/402 |
| 2018/0281190 | A1 * | 10/2018 | Kakisaka | B25J 9/1682 |

FOREIGN PATENT DOCUMENTS

| | | |
|---|---|---|
| JP | 9-16550 | 1/1997 |
| JP | 2004-355482 | 12/2004 |

OTHER PUBLICATIONS

Philip Husbands et al., "Simulated Co-Evolution as The Mechanism for Emergent Planning and Scheduling", Proceedings of the Fourth International Conference on Genetic Algorithms, Jul. 1991, pp. 264-270.

Semra Tunali et al., "A Prototype Rule-Based System to Schedule Production for a Job-Shop", Microprocessing and Microprogramming, vol. 31, No. ⅕, Apr. 1991, pp. 19-23.

Bernard Sauve et al., An Expert System for Scheduling in a Flexible Manufacturing System, Robotics and Computer-Integrated Manufacturing, vol. 3, No. 2, Jan. 1987, pp. 229-233.

* cited by examiner

WORKING BY ROBOT IS POSSIBLE.

WORKING BY ROBOT IS NOT POSSIBLE.

DESIGN CHANGE CANDIDATE

COMPLETED PRODUCT

SUPPORT DEVICE, DESIGN SUPPORT METHOD AND COMPUTER-READABLE NON-TRANSITORY MEDIUM

CROSS-REFERENCE TO RELATED APPLICATION

This application is based upon and claims the benefit of priority of the prior Japanese Patent Application No. 2017-133084, filed on Jul. 6, 2017, the entire contents of which are incorporated herein by reference.

A certain aspect of embodiments described herein relates to a design support device, a design support method and a computer-readable non-transitory medium.

BACKGROUND

It is demanded that a robot is used in an assembling process of a product including a plurality of assembling works. A robot does not perform all assembling works. It is therefore preferable to consider assembling works performed by a robot, in a product design. For example, there is disclosed a technology for determining whether a structure of a product is easy to make, in order to improve productivity of a product (for example, see Japanese Patent Application Publication No. 05-114003).

SUMMARY

However, in the above-mentioned technology, usage effect of a robot is not considered. The usage effect of a robot is a reduction amount of a work time performed by a person in a case where the robot is used.

According to an aspect of the present invention, there is provided a design support device including: a memory; and a processor coupled to the memory and the processor configured to execute a process, the process including: receiving a precedence restriction of each work, a work time of each work and advisability of a robot work of each work, with respect to a product, a plurality of works being needed for producing the product; calculating, as a first index, a continuous work number in a case where each work which a robot cannot perform is changed to a work which the robot can perform, on a basis of the precedence restriction and the advisability of the robot work; calculating, as a second index, an arrangement freedom in the case where each work which the robot cannot perform is changed to a work which the robot can perform, on a basis of the precedence restriction, the work time and the advisability of the robot work; associating information according to the first index and the second index with an object work of the first index and the second index; and presenting the information and the object work.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
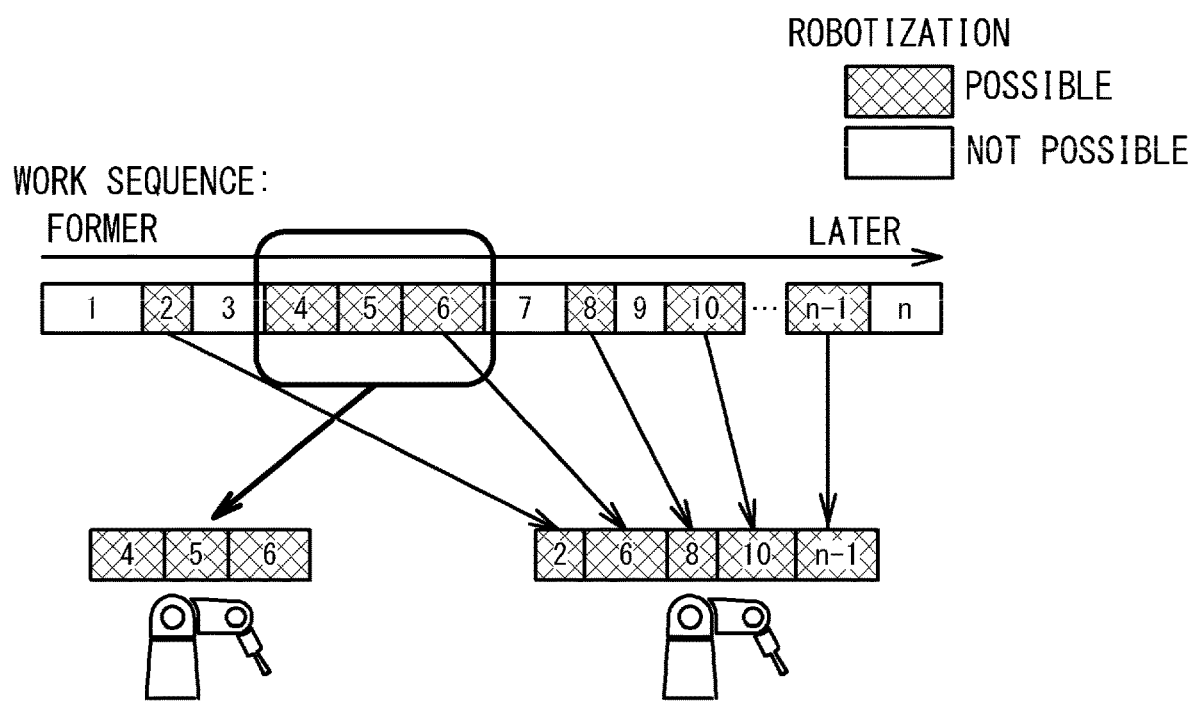
FIG. 1 illustrates an outline of design of process planning by a product designer.

A description will be given of an outline of design of process planning by a product designer, before describing embodiments. In a product assembling, a plurality of works are performed. For example, as illustrated in FIG. 1, a product is produced through a first work to an n-th work. It is not necessary to perform the first work to the n-th work in this order. A plurality of workers may share the first work to the n-th work and perform one or more of the works.

Recently, a robot is actively used in assembling works of a product. However, a robot cannot perform all works of a first work to an n-th work. And so, it is preferable to design an assembly process planning in which a work performed by a robot and a work performed by a person are combined.

In the design of the assembly process planning, it is demanded that the usage effect of a robot is high. It is possible to define that the usage effect of a robot is a reduction amount of a work time performed by a person in a case where the robot is used. It is possible to calculate the reduction amount from a total time of works performed by a person. That is, it is preferable that a robot performs as many works as possible.

Although high usage effect of a robot is demanded, it is difficult to achieve high usage effect of a robot in an actual design of a assembly process planning. This is because it is difficult to consider the usage effect of a robot in a stage of a product design. It is necessary to consider formation of works of which combination number is a huge. In testing of assembling, easiness of assembling by a robot is not estimated.

A description will be given of a conventional design support technology. In the first, there is an automatic assembly task assignment using an optimization calculation. When the optimization calculation is used, even a product designer can perform an assembly task assignment. However, this technology does not assist to get higher usage effect of a robot. A designer himself/herself has to judge the necessity of design change after considering the product specifications, if getting higher robot-usage effect. This task is difficult and time-consuming. In the second, there is a production line simulator. When the simulator is used, it is possible to estimate a layout, a traffic line, a assembly task assignment and so on of the whole production line. However, knowledge of production engineering (industrial engineering, TPS and so on) is needed for execution of the simulator and analyzing of the simulation result. In the third, there is an offline teaching (a robot simulator). When the robot simulator is used, it is possible to form assembling works without an actual robot machine. However, knowledge of robot controlling is needed for determining the works. With the design support technology mentioned above, it is difficult to estimate the usage effect of a robot, at a stage of product designing.

And so, a description will be given of a review of a design support technology of a product that can be manufactured on a production line of which the usage effect of a robot is high. In order to form an assembly process planning of which the usage effect of a robot is high, it is preferable that a plurality of works that can be continuously performed are assigned to a robot. For example, as illustrated in a left lower area of FIG. 1, when the fourth work to the sixth work that can be continuously performed are assigned to a robot, it is possible to reduce a waiting time in which the robot does not work. When the number of continuous works that the robot can perform is a first index, the usage effect of the robot is higher when the first index is larger.

Alternatively, in order to form an assembly process planning of which the usage effect of a robot is high, it is preferable that a work of which an arrangement freedom is high is assigned to the robot. The "arrangement" is arrangement of a work sequence. It is possible to define the arrangement freedom of the work sequence as "a degree with which a work can be arranged in various orders with respect to determination of a work order because of a low restriction depending on other works". For example, as illustrated in a right lower area of FIG. 1, when works independent from other works are assigned to a robot, it is possible to reduce a waiting time in which the robot does not work. When the arrangement freedom is a second index, the usage effect of the robot is higher when the second index is larger.

And so, a description will be given of a design support device, a design support method, and a design support program that are capable of presenting information needed for enlarging the usage effect of a robot, by associating information according to the first index and the second index with object works of the first index and the second index and presenting the information and the object works.

Figure 2A:
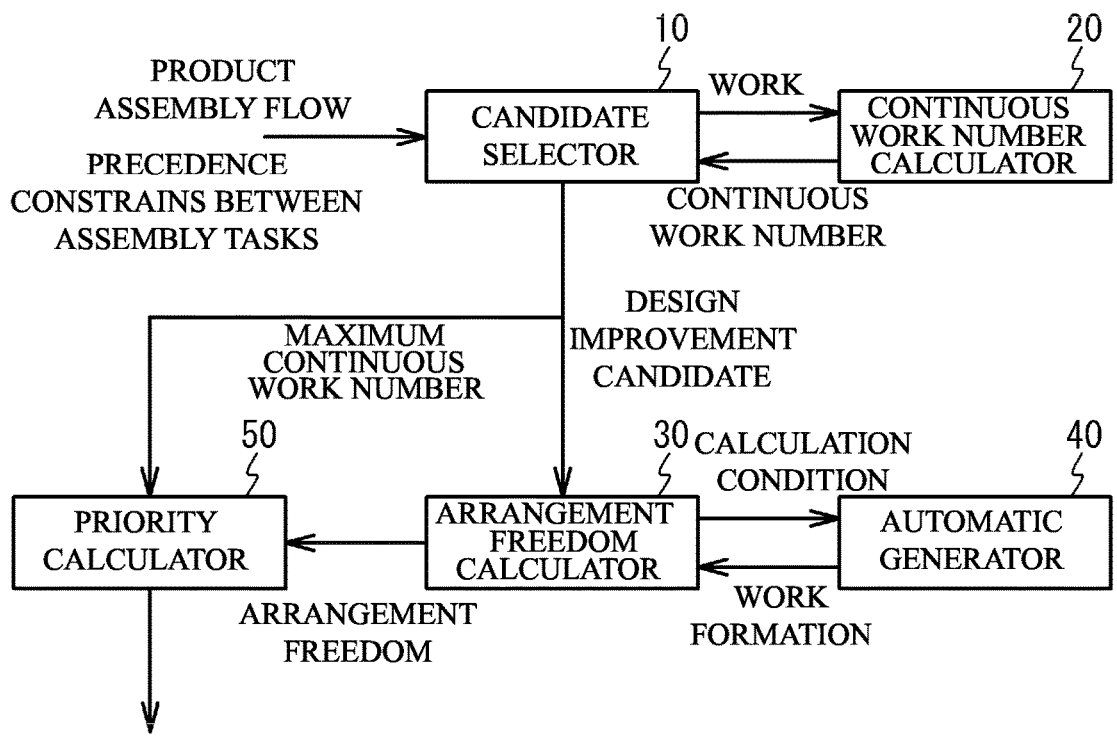
FIG. 2A illustrates a block diagram of a design support device in accordance with a first embodiment.

FIG. 2A illustrates a block diagram of a design support device 100 in accordance with a first embodiment. As illustrated in FIG. 2A, the design support device 100 has a candidate selector 10, a continuous work number calculator 20, an arrangement freedom calculator 30, an automatic generator 40, a priority calculator 50 and so on.

Figure 2B:
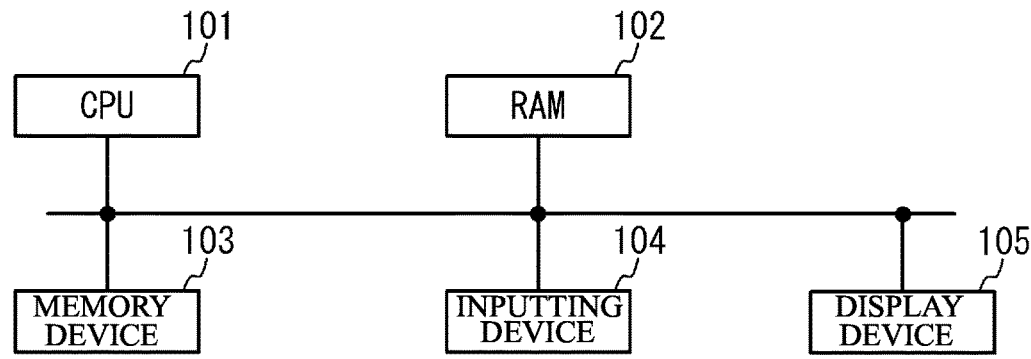
FIG. 2B illustrates a hardware structure of a design support device.

FIG. 2B illustrates a hardware structure of the design support device 100. As illustrated in FIG. 2B, the design support device 100 has a CPU 101, a RAM 102, a memory device 103, an inputting device 104, a display device 105 and so on. These components are coupled to each other with a bus or the like. The CPU 101 is a central processing unit. The CPU 101 includes one or more core. The RAM (Random Access Memory) 102 is a volatile memory temporally storing a program executed by the CPU 101, a data processed by the CPU 101, and so on. The memory device 103 is a nonvolatile memory device. The memory device 103 may be a SSD (Solid State Drive) such as a ROM (Read Only Memory) or a flash memory, or a hard disk driven by a hard disk drive. The inputting device 104 is such as a keyboard, a mouse or the like. The display device 105 is a liquid crystal display, an electroluminescence panel or the like. The display device 105 shows a processed result of the design support device 100. The CPU 101 executes a program stored in the memory device 103. Thus, each unit of the design support device 100 is established. Each unit of the design support device 100 may be a hardware such as a dedicated circuit.

Figure 3:
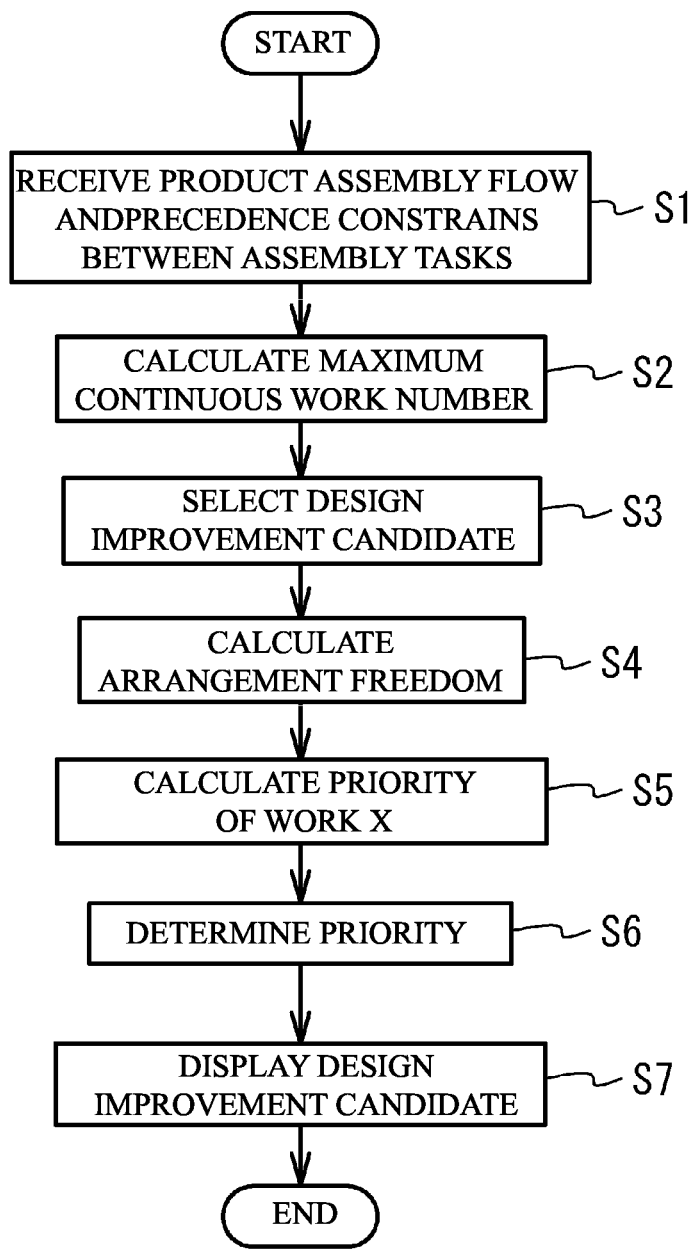
FIG. 3 illustrates a flowchart for an operation example of a design support device.

FIG. 3 illustrates a flowchart for an operation example of the design support device 100. A description will be give of the operation example of the design support device 100 on the basis of FIG. 2A, FIG. 2B and FIG. 3.

The candidate selector 10 receives a product assembly flow and precedence constraints between assembly tasks which a user inputs with use of the inputting device 104 or the like (Step S1). The product assembly flow includes contents of works and a sequence of the works. The contents include a target component, a component weight, a tool, an assembling method, a bonding method, an assembling direction, an assembly holding, a work time of each work, an advisability of a robot work. With respect to the advisability of the robot work, when an imposition work is completed only with works of a single axis direction, it may be determined that the robot work is possible.

Figure 4:
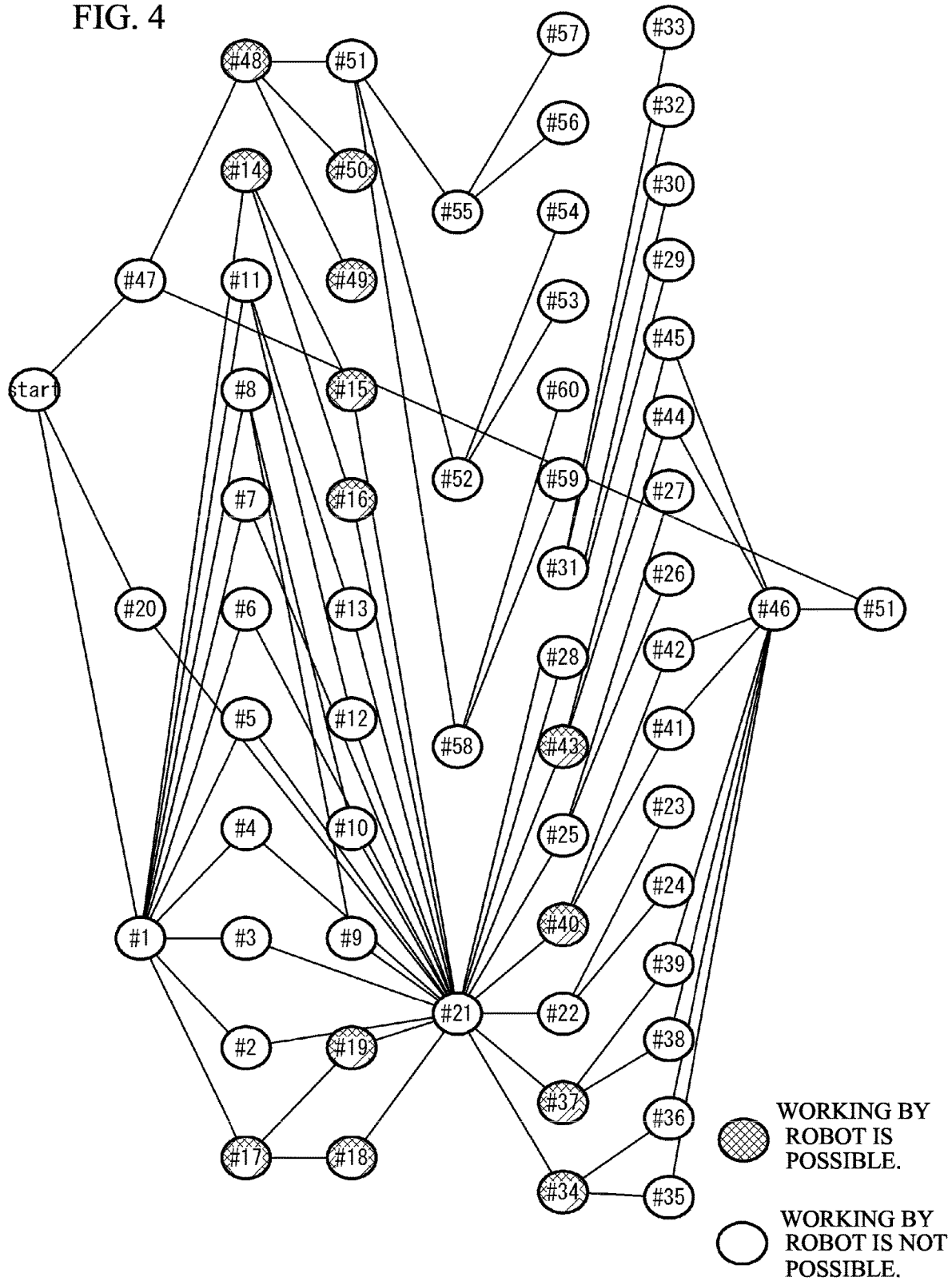
FIG. 4 illustrates precedence constraints of assembly sequence.

The precedence constraints between assembly tasks are information indicating a relationship between a work and another work that has to be finished before the work. For example, when a cover is fitted to a substrate after assembling a component to the substrate, the assembling of the component has to be finished before fitting the cover. FIG. 4 illustrates a precedence constraints of assembly sequence. In FIG. 4, the precedence constraints between assembly tasks are visible with a directed graph. For example, as illustrated in FIG. 4, with respect to a work of #1, there is no work that has to be finished before the work of #1. On the other hand, with respect to a work of #2, the work of #1 has to be finished before the work of #2. FIG. 4 includes the advisability of the robot work.

Figure 5:
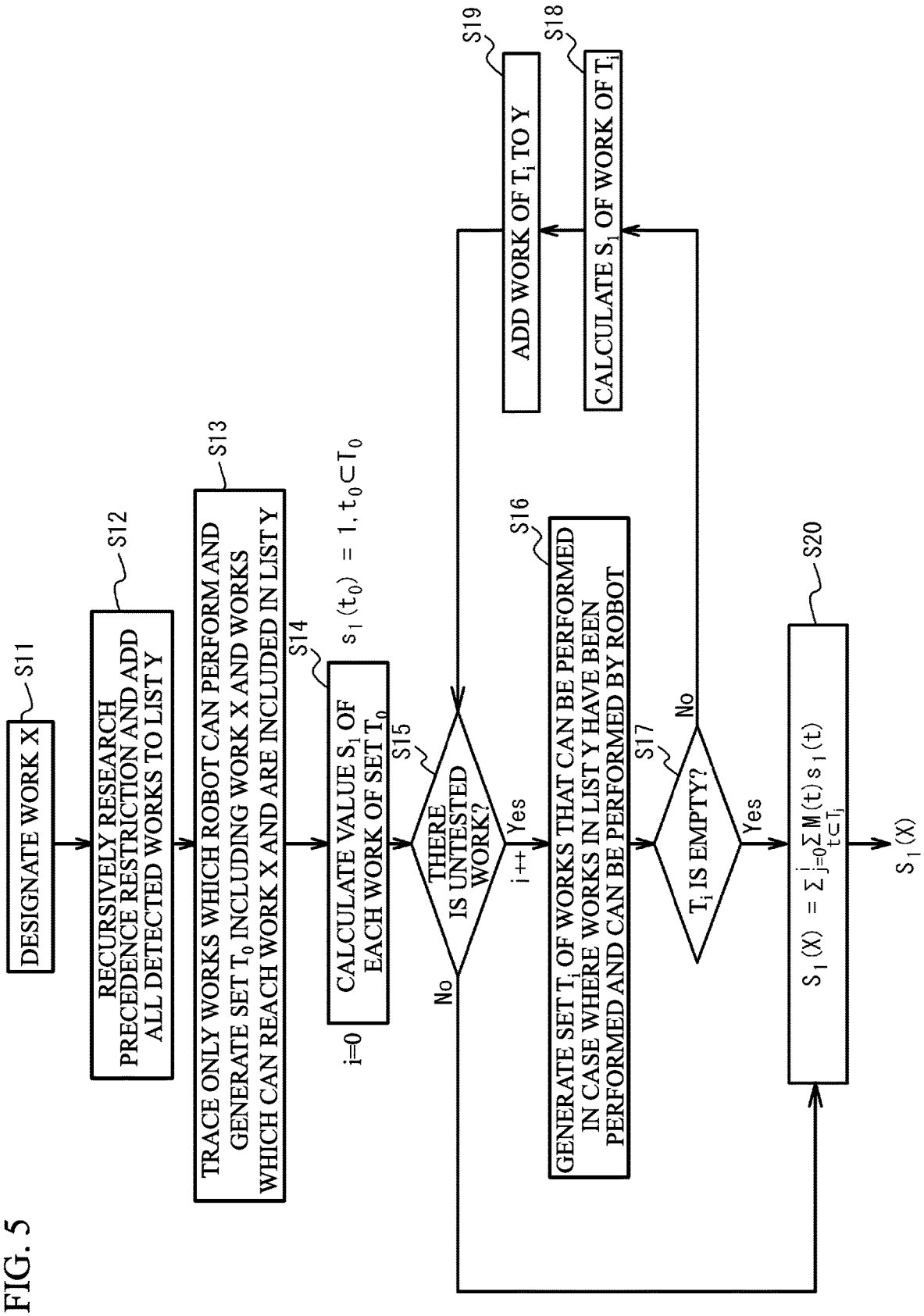
FIG. 5 illustrates a flowchart of details of Step S2.

Next, with use of the precedence constraints between assembly tasks, the continuous work number calculator 20 uses the precedence constraints between assembly tasks and calculates a maximum number of continuous works that a robot can perform, in a case where each work that a robot cannot perform is changed to a work that a robot can perform (Step S2). FIG. 5 illustrates a flowchart of details of Step S2. As illustrated in FIG. 5, the continuous work number calculator 20 designates a work X (Step S11). For example, the continuous work number calculator 20 designates any one of works that a robot cannot perform, as the work X. And, the continuous work number calculator 20 sequentially designates works that a robot cannot perform, by repeating the flowchart of FIG. 5.

Next, the continuous work number calculator 20 recursively researches a precedence restriction of the precedence constraints between assembly tasks from the work X, and adds all detected works to a completed work list Y (Step S12). The precedence restriction is a work that has to be finished before starting the work. The completed work list Y is a work that has to be finished when the work X is finished.

Figure 6:
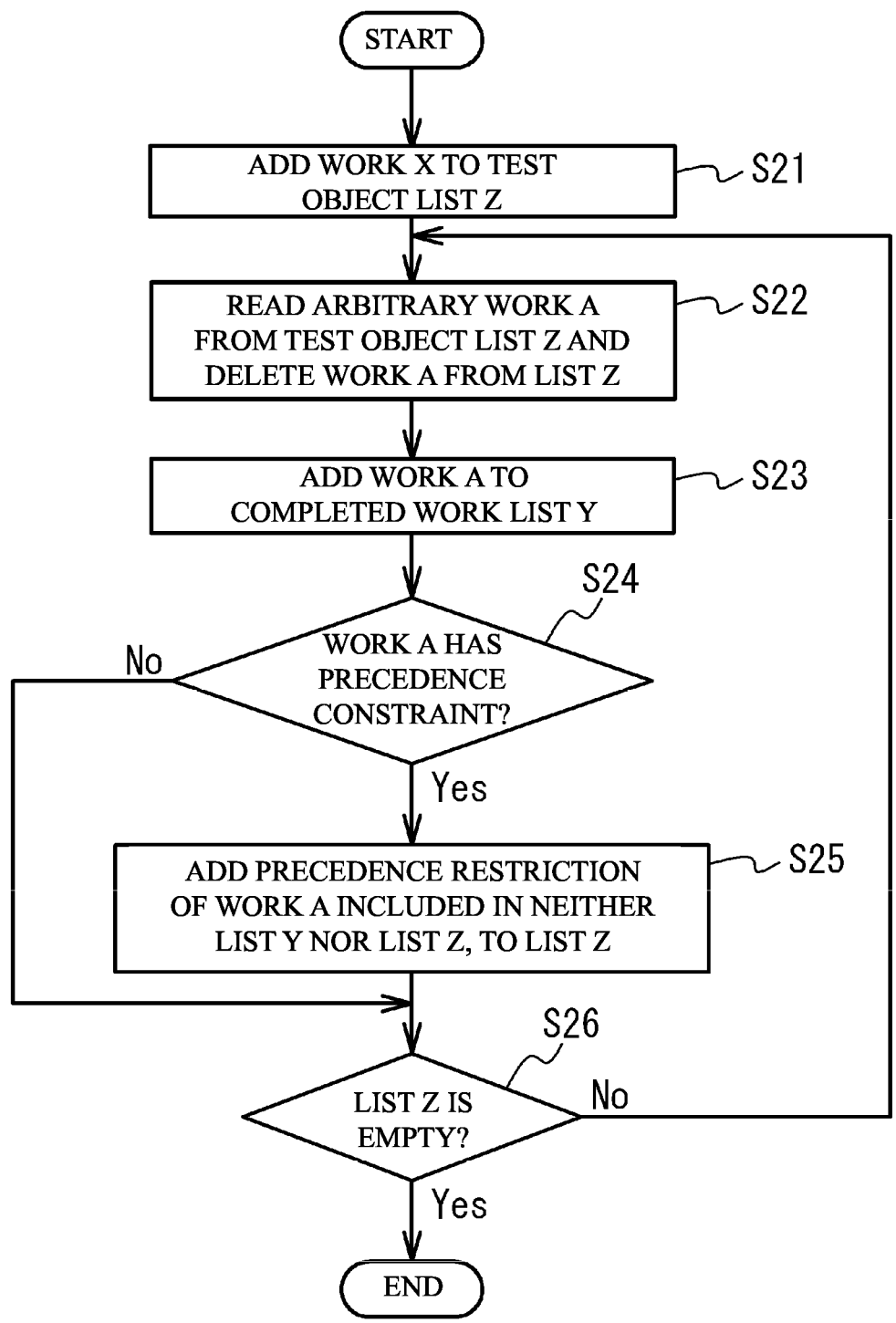
FIG. 6 illustrates a flowchart of details of Step S12.

FIG. 6 illustrates a flowchart of details of Step S12. As illustrated in FIG. 6, the continuous work number calculator 20 adds the work X to a test object list Z (Step S21). Next, the continuous work number calculator 20 reads an arbitrary work A from the test object list Z and deletes the work A from the test object list Z (Step S22). Next, the continuous work number calculator 20 adds the work A to the completed work list Y (Step S23).

Next, the continuous work number calculator 20 determines whether there is a precedence restriction of the work A (Step S24). When a work can be performed just after starting, the work has no precedence constraint. When it is determined as "Yes" in Step S24, the continuous work number calculator 20 adds one or more precedence constraints of the work A that are included in neither the completed work list Y nor the test object list Z, to the test object list Z (Step S25). After execution of Step S25 or when it is determined as "No" in Step S24, the continuous work number calculator 20 determines whether the test object list Z is empty (Step S26). When it is determined as "No" in Step S26, Step S22 is executed again. When it is determined as "Yes" in Step S26, the flowchart is terminated.

As illustrated in FIG. 5, the continuous work number calculator 20 traces only works which a robot can perform, and generates a set $T_0$ including the work X and one or more works which can reach the work X and are included in the completed work list Y (Step S13). The set $T_0$ is a set of one or more works which a robot can continuously perform at an ending of the work X. Next, the continuous work number calculator 20 calculates a value $s_1$ of each work of the set $T_0$ (Step S14). In concrete, it is possible to calculate the value $s_1$ in accordance with the following formula (1). The continuous work number calculator 20 substitutes "0" in the variable "1".

$$s_1(t_0)=1, t_0 \subset T_0 \quad \text{[Formula 1]}$$

Next, the continuous work number calculator 20 determines whether there is one or more untested work (Step S15). When it is determined as "Yes" in Step S15, the continuous work number calculator 20 adds "1" to the variable "i" and generates a set $T_i$ composed of works that can be performed in a case where works included in the completed work list Y have been performed, are not included in the completed work list Y, and can be performed by a robot (Step S16). However, the same result can be obtained when the set $T_i$ is composed of works that have a precedence work included in a set $T_{i-1}$ in a case of i>1, are not included in the completed work list Y and can be performed by a robot.

Next, the continuous work number calculator 20 determines whether the set $T_i$ is empty (Step S17). When it is determined as "No" in Step S17, the continuous work number calculator 20 calculates a value $s_1$ of each work of the set $T_i$ (Step S18). In concrete, the continuous work number calculator 20 calculates the value $s_1$ of each work in accordance with the following formula (2). However, "$t_j$" is a work in the set $T_i$. "u" is a work of a parent node of the work $t_j$. "l" is the number or works in the set "u". $s_1(u)$ which is not calculated is "0". Next, the continuous work number calculator 20 adds a work in the set $T_i$ to the completed work list Y (Step S19). After that, Step S15 is executed again.

$$s_1(t_j) = \frac{1}{l} \sum_{u_k \subset u} s_1(u_k), t_j \subset T_i \quad \text{[Formula 2]}$$

When it is determined as "Yes" in Step S17, the continuous work number calculator 20 calculates a score $S_1(X)$ of the work X (Step S20). In concrete, the continuous work number calculator 20 calculates the score $S_1(X)$ in accordance with the following formula (3). M(t) of the formula (3) is a value, such as a work time or equipment cost, that is determined in accordance with a work. When M(t) is estimated only as a continuous work number, M(t) is "1". With the processes, the score $S_1(X)$ of the work X is calculated. When above-mentioned processes are applied to all works, each score of each work is calculated. As a first index, the continuous work number calculated by the continuous work number calculator 20 is sent to the candidate selector 10.

$$s_1(X) = \sum_{j=0}^{i} \sum_{t \subset T_j} M(t)s_1(t) \quad \text{[Formula 3]}$$

A description will be given of an execution example of the flowcharts of FIG. 5 and FIG. 6. The set $T_0$ is $\{t_1\}$, the completed work list Y is $\{t_1\}$ and the score $s_1$ is $\{1\}$ after execution of Step S11 to Step S14, when the work of #1 is noticed. Next, after execution of Step S15 to Step S20, the set $T_0$ is $\{t_1\}$, $T_1$ is $\{t_4, t_{17}\}$, the completed work list Y is $\{t_1, t_{14}, t_{17}\}$, $s(t_{14})$ and $s(t_{17})$ are "1", and the score $s_1$ is $\{1, 1, 1\}$. The set $T_2$ is $\{t_{15}, t_{16}, t_{18}, t_{19}\}$ and $s(t_{15})$, $s(t_{16})$, $s(t_{18})$ and $s(t_{19})$ are "1". The set $T_3$ is empty. Therefore, $s_1(t_1)$ is "7". $T_0$ is $\{t_{21}, t_{14}, t_{15}, t_{16}, t_{17}, t_{18}, t_{19}\}$, $T_1$ is $\{t_{34}, t_{37}, t_{40}, t_{43}\}$ and the set $T_2$ is empty, when the work of #21 is noticed. Therefore, $s_1(t_{21})$ is "11".

Figure 7:
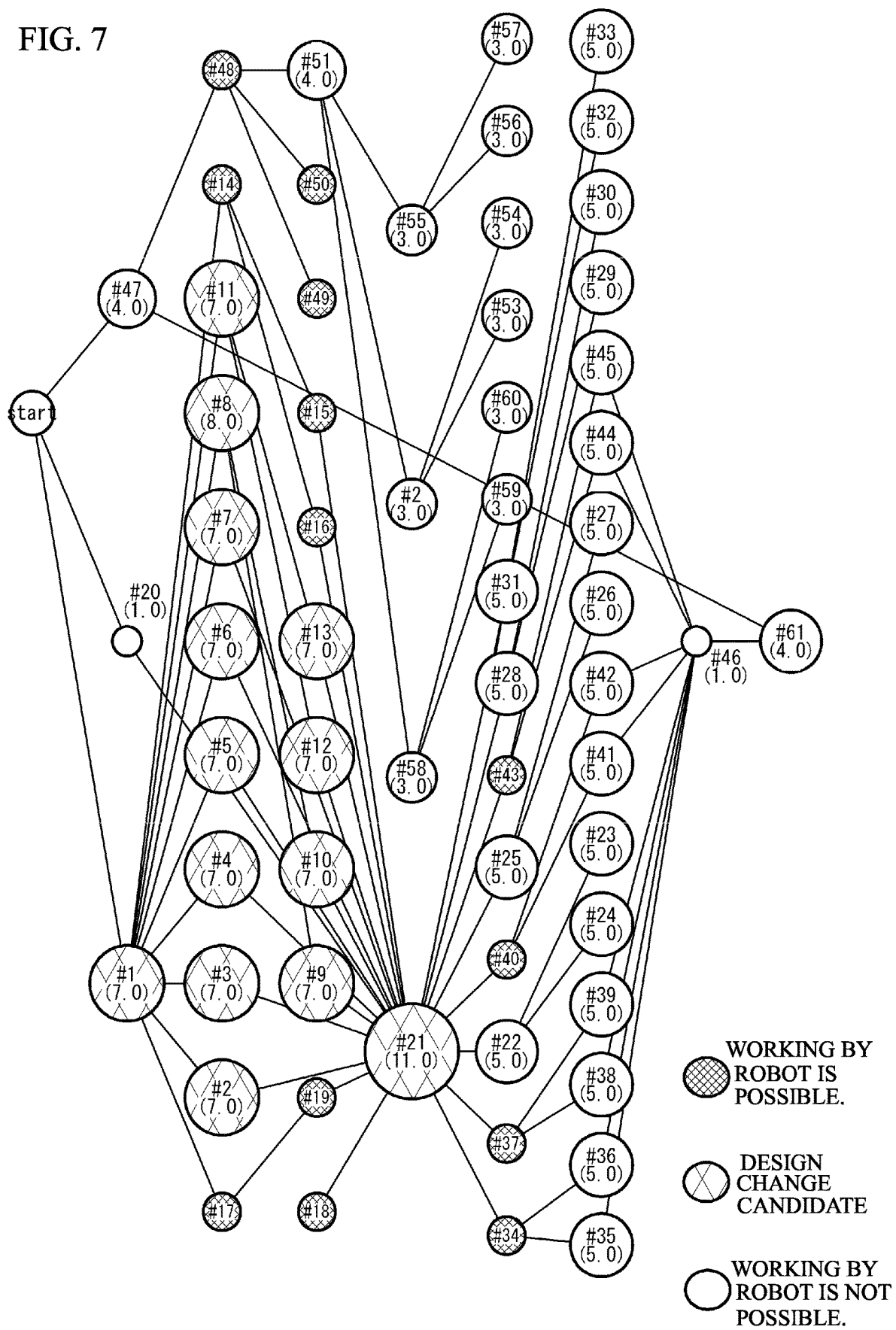
FIG. 7 illustrates design improvement candidates.

As illustrated in FIG. 3, the candidate selector 10 sorts each work which a robot cannot perform, in descending order of the first index, and selects the highest n-number of works as design improvement candidates (Step S3). Works of which the continuous work number is equal or more than a threshold may be selected as design improvement candidates. FIG. 7 illustrates the design improvement candidates. In FIG. 7, works of which the score is the highest to the tenth highest and works of which the score is the same as that of the tenth highest score are determined as the design improvement candidates.

Figure 8B:
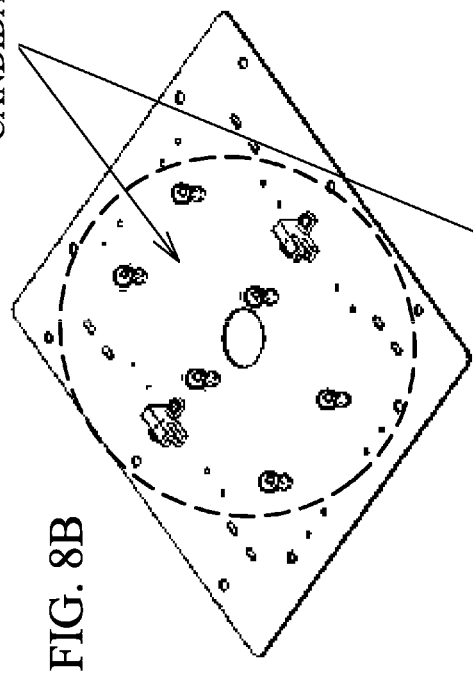
FIG. 8A to FIG. 8C illustrate a continuous work number.
Figure 8C:
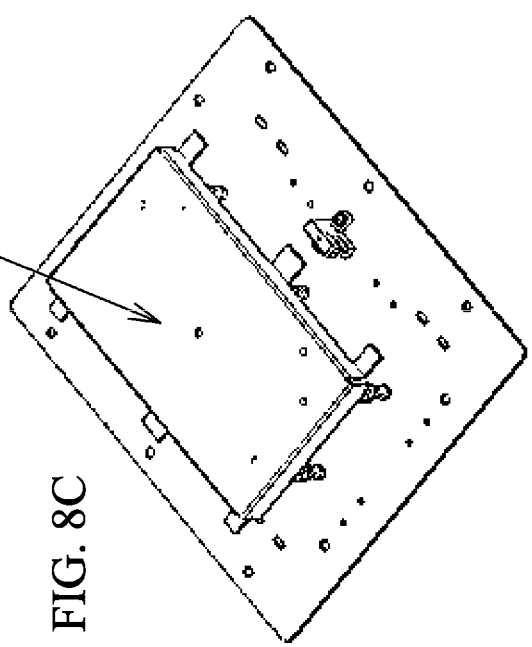
Figure 8A:
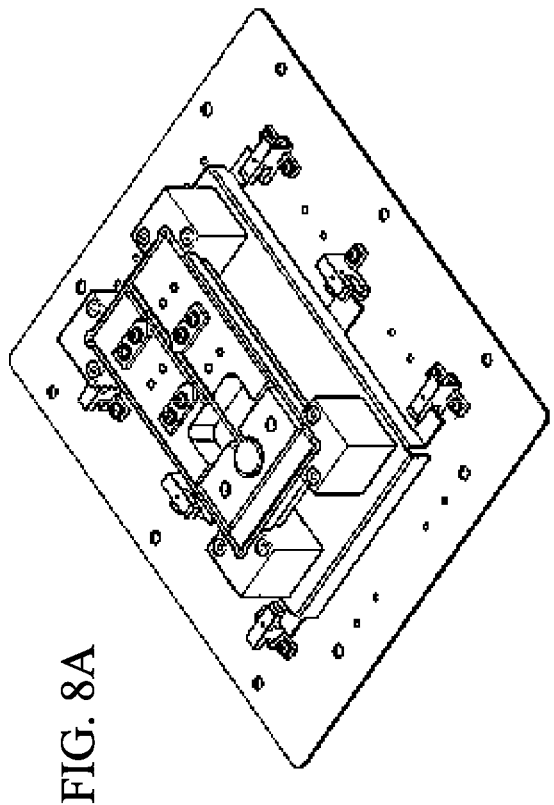

FIG. 8A to FIG. 8C illustrate the continuous work number. FIG. 8A illustrates a completed product. Before FIG. 8A, it is necessary to attach a plate cover of FIG. 8C. Before attaching the plate cover, it is necessary to impose eight components in the plate cover and complete screw fastening. In the example, the continuous work number is large with respect to the imposing of the plate cover of FIG. 8C, imposing of the eight components and the screw fastening of FIG. 8B. Therefore, these works are selected as the design improvement candidates.

However, the imposing of the plate cover corresponds to the work of #21 in FIG. 4. This work has the largest continuous work number. However, the precedence constraints between assembly tasks is complex. Therefore, it is not always effective to use a robot in the works of which the continuous work number is the largest. And so, next, an arrangement freedom is calculated as the second index. The arrangement freedom calculator 30 performs a plurality of assembly task assignments of which a condition is different from each other, and calculates the number in which the work is set in the robot process, as the arrangement freedom (Step S4).

Figure 9:
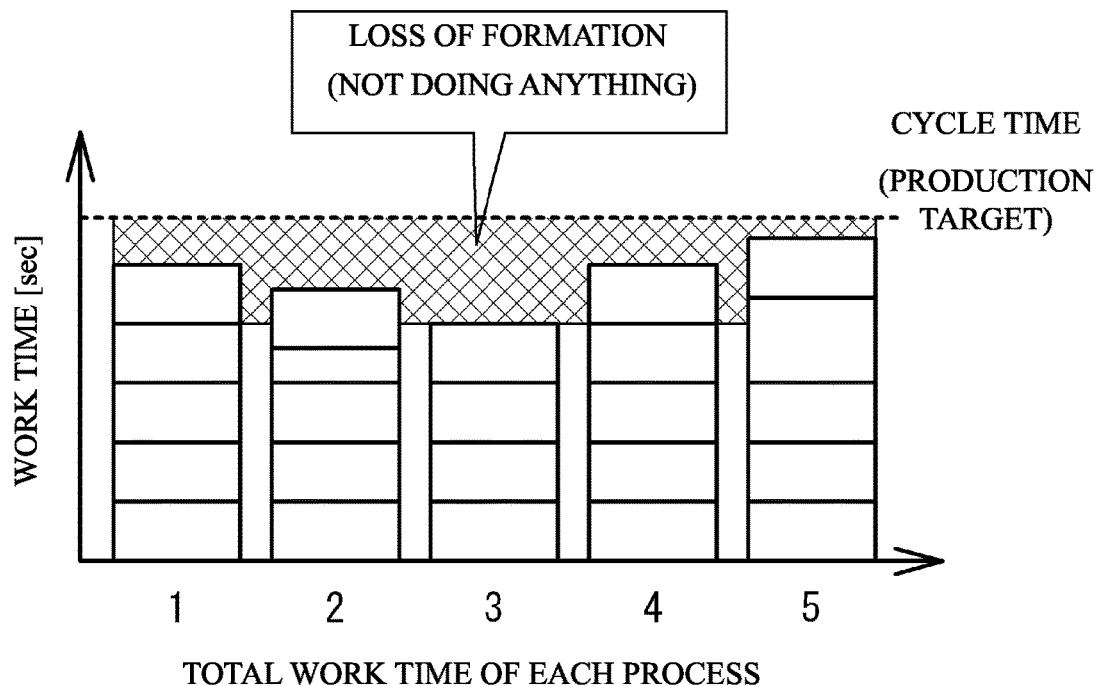
FIG. 9 illustrates a cycle time and a process.

For example, as illustrated in FIG. 9, a cycle time is set. The cycle time is a time for matching the timing of each process. The process is each group in a case where all works needed for product assembly are assigned to a plurality of groups. At least one of the groups includes only works which a robot can perform. The group is a set of works which a robot performs. Therefore, the set may be called a robot process. A process which a person performs may include a work which a robot can perform, in addition to a work which the robot cannot perform.

It is necessary for a person and a robot to complete works assigned to them within the cycle time. When the cycle time is set, it is possible to calculate the number of the person and the robot (the number of processes) to which each work is assigned. As the arrangement freedom, the arrangement freedom calculator 30 and the automatic generator 40 calculate the number of times the object work is included in the robot process, when works are formed so that the formation loss is minimized, on the basis of the work time of each work and the precedence constraints between assembly tasks. During the formation, the object work is treated as a work which a robot can perform.

Figure 10:
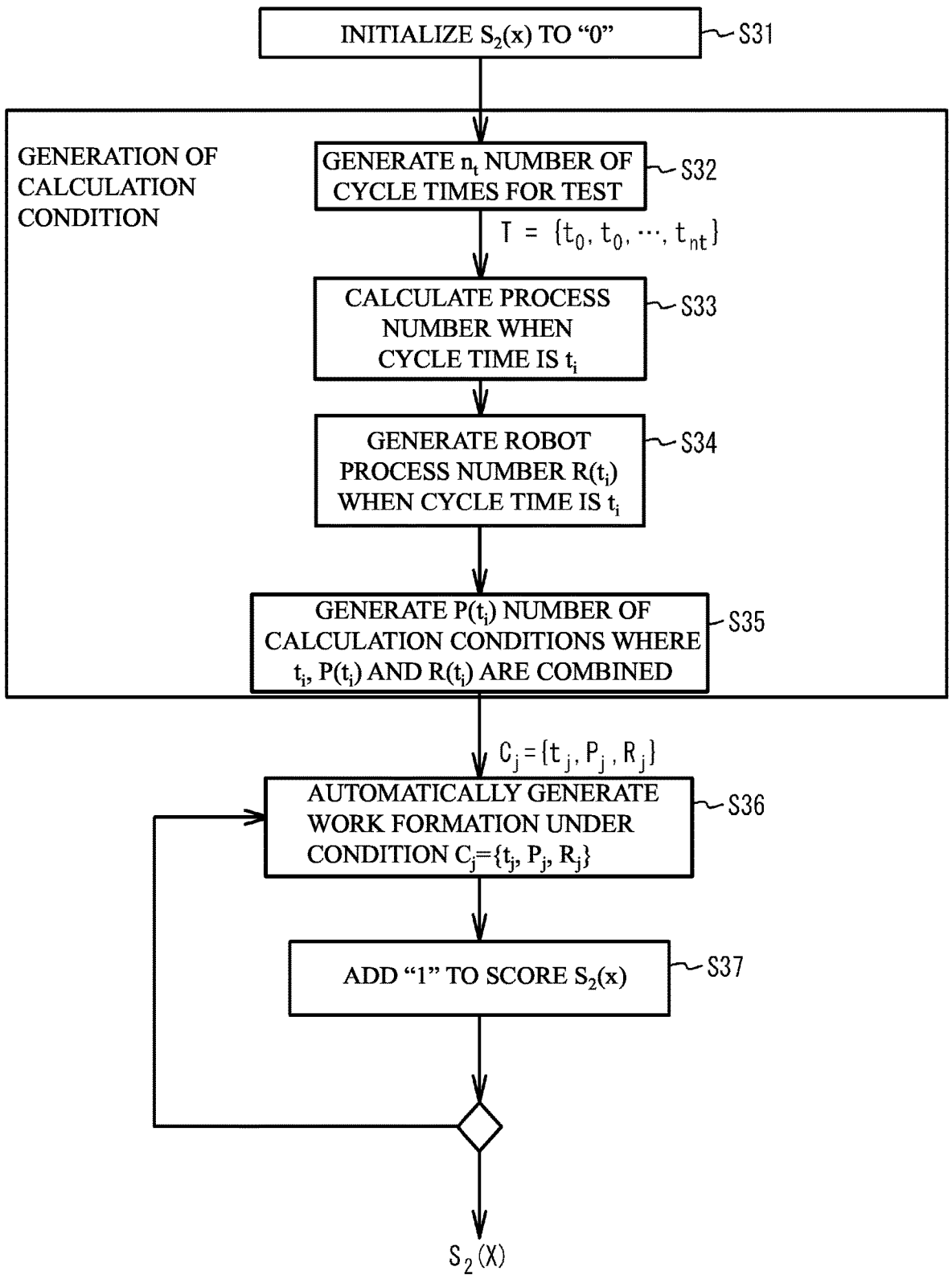
FIG. 10 illustrates a flowchart of details of Step S4.

FIG. 10 illustrates a flowchart of details of Step S4. As illustrated in FIG. 10, the arrangement freedom calculator 30 initializes a score $S_2(X)$ of the design improvement candidate X to "0" (Step S31). Next, the arrangement freedom calculator 30 generates $n_t$ numbers of cycle times for test (Step S32). For example, the cycle time T is $T=\{t_0, t_1, \ldots, t_{nt}\}$. The arrangement freedom calculator 30 takes samples within a range from the longest work time of a single work to $\Sigma CT/2$. $\Sigma CT$ is a total work time in a case where all works are performed by persons.

Next, the arrangement freedom calculator 30 calculates the number of processes $P(t_i)$ when the cycle time is $t_i$ (Step S33). For example, the arrangement freedom calculator 30 calculates the number of processes $P(t_i)$ in accordance with the formula of $P(t_i)=\text{ceil}(\Sigma CT/(2t_i))$. Next, the arrangement freedom calculator 30 generates the robot process number $R(t_i)$ when the cycle time is $t_i$ (Step S34). For example, the arrangement freedom calculator 30 generates the robot process number $R(t_i)$ in accordance with $0<R(t_i)\in \text{Integer} \leq P(t_i)$. Step S32 to Step S34 are a calculation condition generation process. The generated calculation condition is transmitted to the automatic generator 40.

Next, the arrangement freedom calculator 30 generates $P(t_i)$ number of calculation conditions in which $t_i$, $P(t_i)$ and $R(t_i)$ are combined (Step S35). Next, the automatic generator 40 automatically generates a assembly task assignment under a calculator condition of $C_j=\{t_j, P_j, R_j\}$ (Step S36). With use of an optimization calculation, the automatic generator 40 determines assignment of works so that the formation loss is minimized. The automatic generator 40 uses works which a robot can perform, a restriction that design improvement candidates whose number is equal to or less than $N_{accept}$ are included, and the precedence constraints between assembly tasks, in the robot process. For example, the automatic generator 40 can find a solution with use of a local search such as a tabu search. The automatic generator 40 calculates a cycle time $T_p$ of a process p with use of the following formulas (4) and (5). P(X) is a process number including the work X. T(X) is a work time of the work X.

$$T_p = \sum_{X \in X_{all}} T_p(X_k) \qquad \text{[Formula 4]}$$

$$T_p(X_k) = \text{if } P(X_k) = j, T(X_k), \text{otherwise, } 0 \qquad \text{[Formula 5]}$$

Next, the automatic generator 40 determines a process number P(X) of works achieving minimization of the formation loss, in accordance with target functions expressed by the following formulas (8) to (10), under a condition that a design improvement candidate of the formula (6) is included and precedence constraints between assembly tasks of the formula (7) is satisfied. $X_c$ of the formula (7) is a set of design improvement works. $X_{parent}(X_k)$ of the formula (8) is a work that should be finished before performing the work $X_k$. The formation loss is a time in which neither a person nor a robot performs a work, as illustrated in FIG. 9. In FIG. 9, "1" to "5" of a horizontal axis indicate a process number. In the formula (7), "M"=$P_j$ is the number of processes. $T_{max}$ is a maximum value of $T_1, \ldots, T_m$. $T_{min}$ is a minimum value of $T_1, \ldots, T_m$.

$$\sum_{X \in X_{all}} M(X_k) \leq N_{accept} \qquad \text{[Formula 6]}$$

$$M(X_k) = \text{if } P(X_k) = R_j \text{ and } X_k \in X_c, 1, \text{otherwise, } 0 \qquad \text{[Formula 7]}$$

$$P(X_l) \leq P(X_k), X_l \in X_{parent}(X_k) \qquad \text{[Formula 8]}$$

$$F = w(T_{max})|T_{max} - t_j| + |T_{max} - T_{min}| \qquad \text{[Formula 9]}$$

$$w(T_{max}) = \text{if } T_{max} > t_j, 1, \text{otherwise, } 0 \qquad \text{[Formula 10]}$$

Next, the arrangement freedom calculator 30 adds "1" to the score $S_2(x)$ of the design improvement candidate X included in the robot process (Step S37). Step S36 and Step S37 are repeated $C_j$ times. Thus, the arrangement freedom $S_2(x)$ of the work X is calculated. The arrangement freedom calculated by the arrangement freedom calculator 30 is transmitted to the priority calculator 50, as the second index.

As illustrated in the flowchart of FIG. 3, the priority calculator 50 calculates the priority $F_p(x)$ of the work X (Step S5). For example, the priority calculator 50 calculates the priority $F_p(x)$ in accordance with the formula of $F_p(X)=w_1 S_1(X)+w_2 S_2(X)$. The weight $w_1$ and the weight $w_2$ are equal to 0 or more and 1 or less. The weight $w_1$ and the weight $w_2$ are not limited. Next, the priority calculator 50 sorts the priority $F_p(X)$ in a descendent order and determines a priority of a position to be design-improved (Step S6).

Figure 11:
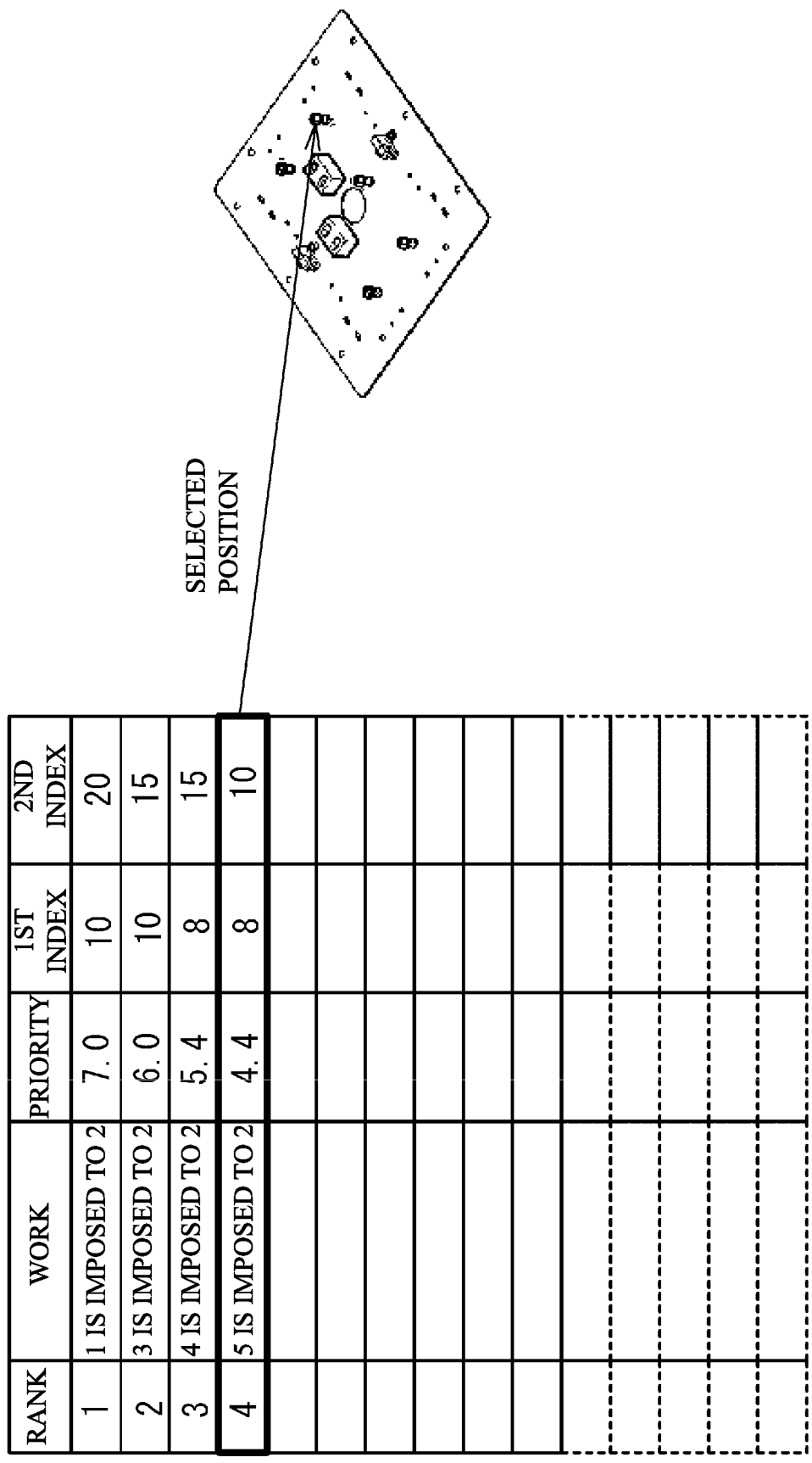
FIG. 11 illustrates a displayed screen.

Next, the priority calculator 50 makes the display device 105 show a list of design improvement candidates with scores (Step S7). FIG. 11 illustrates a displayed screen. As illustrated in a left area of FIG. 11, a list of design improvement candidates is displayed in an ascending order of priority. As illustrated in a right area of FIG. 11, components relating to a work corresponding to a selected position of the list is shown. Therefore, the product designer can understand a candidate to be design-improved.

In the embodiment, a priority is presented as information according to the first index and the second index. And the object work of the first index and the second index is proposed. When the product is designed on the basis of the first index and the second index, it is possible to enlarge the usage effect of a robot. That is, it is possible to present information needed for enlarging the usage effect of a robot. Therefore, productivity is improved. And, it is possible to reduce return processes between the design process and the producing process, in the product development.

In the embodiment, a priority in a case where the first index and the second index are weighed and added is presented to a designer. However, the structure is not limited. For example, without weighting the first index and the second index, the both indices and the work may be presented to the designer.

Figure 12A:
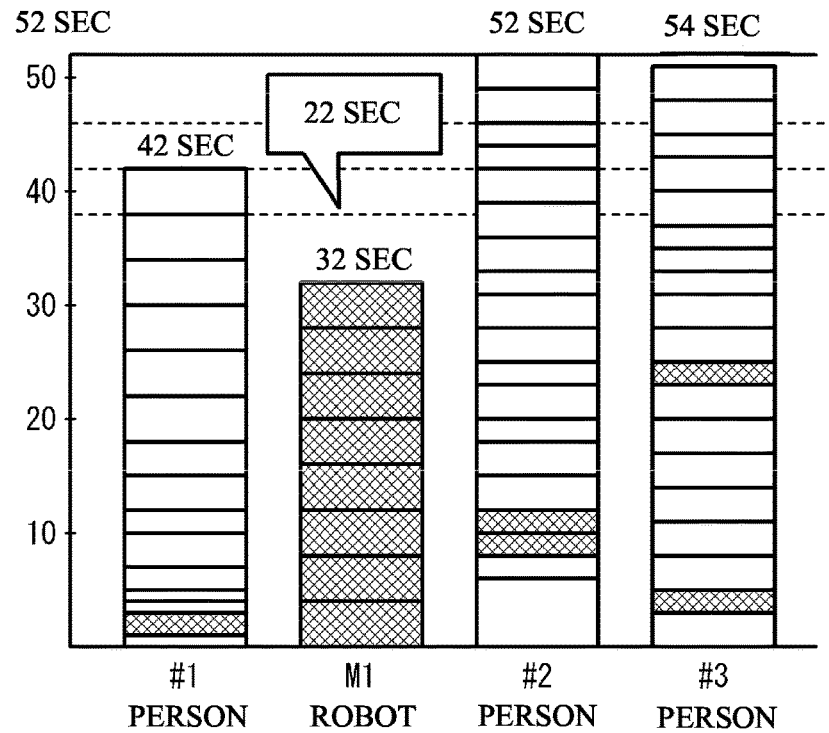
FIG. 12A and FIG. 12B illustrate a case where a structure at a position of a presented common component is changed.
Figure 12B:
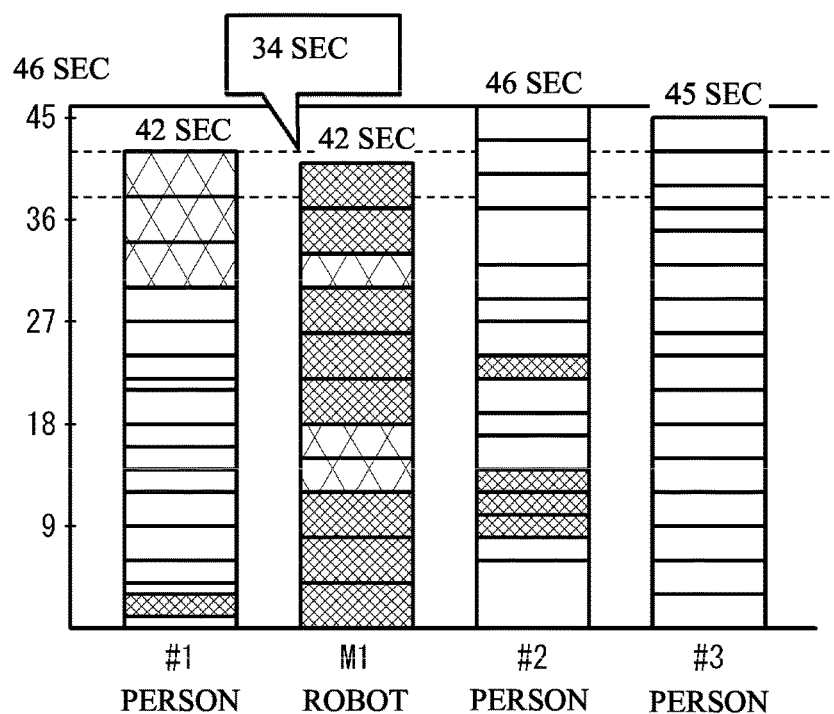

FIG. 12A and FIG. 12B illustrate a case where a structure at a position of a presented common component is changed. For example, a work needing a screw fitting is changed to another work needing a claw fitting so that a robot can perform the work. Thus, the usage effect of a robot of 32 seconds/167 seconds=approximately 19% is improved to that of 42 seconds/167 seconds=approximately 25%.

In the embodiment, the second index is calculated with respect to only the design improvement candidate. However, the structure is not limited. For example, the second index may be calculated with respect to all works which a robot cannot perform. However, when the second index is calculated with respect to only the design improvement candidate, it is possible to reduce the calculation amount. And it is possible to precede the first index.

Figure 13:
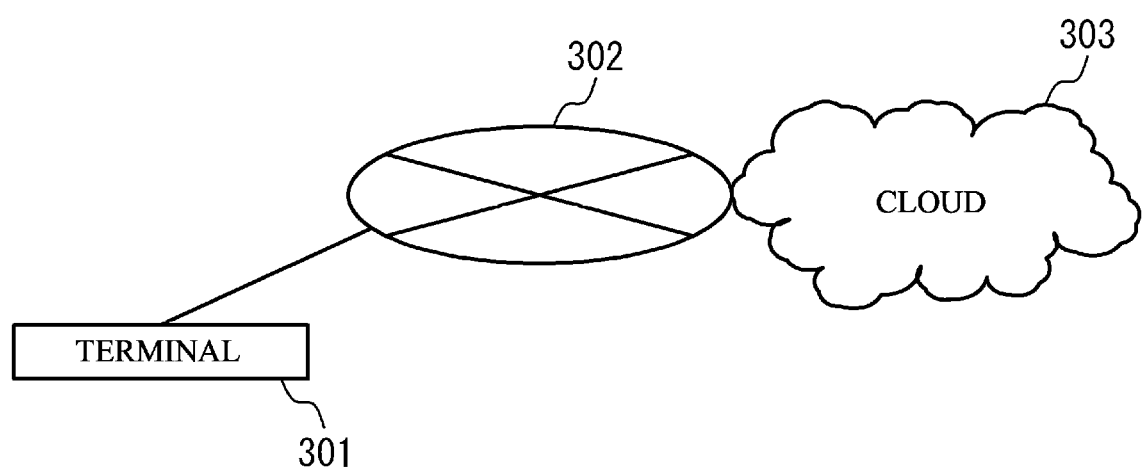
FIG. 13 illustrates a design support system using cloud.

(Others) FIG. 13 illustrates a design support system using cloud. As illustrated in FIG. 13, the design support system has a structure in which a terminal 301 having the inputting device 104 and the display device 105 is coupled with a cloud 303 via an electrical communication line 302 such as internet. The cloud 303 has the CPU 101, the RAM 102 and the memory device 103 illustrated in FIG. 2B and has the functions of FIG. 2A. A server coupled via an intranet may be used instead of the cloud 303.

In the above-mentioned embodiment, the candidate selector 10 acts as an example of a receiver configured to receive a precedence restriction of each work, a work time of each work and advisability of a robot work of each work, with respect to a product, a plurality of works being needed for producing the product. The continuous work number calculator 20 acts as an example of a first calculator) configured to calculate, as a first index, a continuous work number in a case where each work which a robot cannot perform is changed to a work which the robot can perform, on a basis of the precedence restriction and the advisability of the robot work. The arrangement freedom calculator 30 and the automatic generator 40 act as an example of a second calculator configured to calculate, as a second index, an arrangement freedom in the case where each work which the robot cannot perform is changed to a work which the robot can perform, on a basis of the precedence restriction, the work time and the advisability of the robot work. The priority calculator 50 acts as a presenter configured to associate information according to the first index and the second index with an object work of the first index and the second index, and present the information and the object work.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A design support device configured to assign a plurality of works to a robot and a person, the design support device comprising:
   a memory; and
   a processor coupled to the memory and the processor configured to execute a process, the process comprising:
      receiving a precedence restriction of each work, a work time of each work and an advisability of a robot work of each work, with respect to a product, the plurality of works to be executed for producing the product;
      calculating, as a first index, a continuous work number in a case where each work which the robot cannot perform is changed to a work which the robot can perform, on a basis of the precedence restriction and the advisability of the robot work;
      calculating, as a second index, an arrangement freedom in the case where each work which the robot cannot perform is changed to a work which the robot can perform, on a basis of the precedence restriction, the work time and the advisability of the robot work, the arrangement freedom indicating a degree with which a work is arranged in various orders with respect to determination of a work order regardless of other works;
      associating information according to the first index and the second index with an object work of the first index and the second index; and
      presenting the information and the object work,
      wherein the arrangement freedom is a number of times the object work is included in a robot process, when works are formed so that a formation loss is minimized,
      wherein the robot process is a group including only a work which the robot performs, in a case where the plurality of works are assigned to a plurality of groups including the group including only a work which the robot performs, regarding each of a plurality of set cycle times,
      wherein the formation loss is a time in which neither the person nor the robot performs the plurality of works.

2. The design support device as claimed in claim 1, wherein a calculation object of the arrangement freedom is limited to a work of which the first index is equal to or more than a threshold.

3. The design support device as claimed in claim 1, wherein:
   a priority of each work is calculated by adding a weight to the first index and the second index;
   the priority is associated with each work; and
   the priority and the work are presented.

4. A design support method to assign a plurality of works to a robot and a person, the method comprising:
   receiving a precedence restriction of each work, a work time of each work and an advisability of a robot work of each work, with respect to a product, the plurality of works to be executed producing the product;
   calculating, as a first index, a continuous work number in a case where each work which the robot cannot perform is changed to a work which the robot can perform, on a basis of the precedence restriction and the advisability of the robot work;
   calculating as a second index, an arrangement freedom in the case where each work which the robot cannot perform is changed to a work which the robot can perform, on a basis of the precedence restriction, the work time and the advisability of the robot work, the arrangement freedom indicating a degree with which a work is arranged in various orders with respect to determination of a work order regardless of other works;
   associating information according to the first index and the second index with an object work of the first index and the second index; and
   presenting the information and the object work,
   wherein the arrangement freedom is a number of times the object work is included in a robot process, when works are formed so that a formation loss is minimized,
   wherein the robot process is a group including only a work which the robot performs, in a case where the plurality of works are assigned to a plurality of groups including the group including only a work which the robot performs, regarding each of a plurality of set cycle times, wherein the formation loss is a time in which neither the person nor the robot performs the plurality of works.

5. The design support method as claimed in claim 4, wherein a calculation object of the arrangement freedom is limited to a work of which the first index is equal to or more than a threshold.

6. The design support method as claimed in claim 4, wherein:

a priority of each work is calculated by adding a weight to the first index and the second index;

the priority is associated with each work; and the priority and the work are presented.

7. A computer-readable, non-transitory medium storing a program that causes a computer to execute a process to assign a plurality of works to a robot and a person, the process comprising:

receiving a precedence restriction of each work, a work time of each work and an advisability of a robot work of each work, with respect to a product, the plurality of works to be executed for producing the product;

calculating, as a first index, a continuous work number in a case where each work which the robot cannot perform is changed to a work which the robot can perform, on a basis of the precedence restriction and the advisability of the robot work, the arrangement freedom indicating a degree with which a work is arranged in various orders with respect to determination of a work order regardless of other works;

calculating as a second index, an arrangement freedom in the case where each work which the robot cannot perform is changed to a work which the robot can perform, on a basis of the precedence restriction, the work time and the advisability of the robot work;

associating information according to the first index and the second index with an object work of the first index and the second index; and presenting the information and the object work, wherein the arrangement freedom is a number of times the object work is included in a robot process, when works are formed so that a formation loss is minimized, wherein the robot process is a group including only a work which the robot performs, in a case where the plurality of works are assigned to a plurality of groups including the group including only a work which the robot performs, regarding each of a plurality of set cycle times, wherein the formation loss is a time in which neither the person nor the robot performs the plurality of works.

8. The medium as claimed in claim 7, wherein a calculation object of the arrangement freedom is limited to a work of which the first index is equal to or more than a threshold.

9. The medium as claimed in claim 7, wherein:

a priority of each work is calculated by adding a weight to the first index and the second index;

the priority is associated with each work; and the priority and the work are presented.

* * * * *